(12) United States Patent
Lu et al.

(10) Patent No.: US 11,104,030 B2
(45) Date of Patent: *Aug. 31, 2021

(54) METHOD FOR CONSTRUCTING A PRINTED CERAMIC OBJECT AND A CERAMIC OBJECT CONSTRUCTED BY THE SAME

(71) Applicant: City University of Hong Kong, Kowloon (HK)

(72) Inventors: Jian Lu, Kowloon (HK); Guo Liu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 306 days.

This patent is subject to a terminal disclaimer.

(21) Appl. No.: 15/996,832

(22) Filed: Jun. 4, 2018

(65) Prior Publication Data

US 2019/0366583 A1 Dec. 5, 2019

(51) Int. Cl.
| | | |
|---|---|---|
| *B33Y 10/00* | (2015.01) | |
| *C04B 35/64* | (2006.01) | |
| *C04B 35/571* | (2006.01) | |
| *B28B 1/00* | (2006.01) | |
| *B28B 11/00* | (2006.01) | |
| *C09D 11/102* | (2014.01) | |
| *B28B 3/00* | (2006.01) | |
| *B28B 1/02* | (2006.01) | |
| *C09D 11/02* | (2014.01) | |

(52) U.S. Cl.
CPC ............ *B28B 1/001* (2013.01); *B28B 11/003* (2013.01); *B33Y 10/00* (2014.12); *C04B 35/571* (2013.01); *C04B 35/64* (2013.01); *C09D 11/102* (2013.01); *C04B 2235/483* (2013.01); *C04B 2235/6026* (2013.01); *C04B 2235/656* (2013.01); *C04B 2235/95* (2013.01)

(58) Field of Classification Search
None
See application file for complete search history.

(56) References Cited

U.S. PATENT DOCUMENTS 10,377,076 B2 * 8/2019 Lu ..................... B33Y 70/00
2018/0361660 A1 * 12/2018 Chen ................. B29C 64/245

OTHER PUBLICATIONS

U.S. Appl. No. 15/663,961, filed Aug. 2019, Lu; Jian.*
Science Advances Aug. 17, 2018: vol. 4, No. 8, eaat0641 DOI: 10.1126/sciadv.aat0641 (Year: 2018).*
Yang, Yang, et al. "3D Printing of Shape Memory Polymer for Functional Part Fabrication." The International Journal of Advanced Manufacturing Technology, vol. 84, No. 9-12, 2015, pp. 2079-2095., doi: 10.1007/s00170-015-7843-2. (Year: 2016).*
McNulty TF, Mohammadi F, Bandyopadhyay A, Shanefield DJ, Danforth SC, Safari A (1998) Development of a binder formulation for fused deposition of ceramics. Rapid Prototyp J 4(4): 144-150 (Year: 1998).*

* cited by examiner

*Primary Examiner* — Alison L Hindenlang
*Assistant Examiner* — Andrés E. Behrens, Jr.
(74) *Attorney, Agent, or Firm* — Renner Kenner Greive Bobak Taylor & Weber

(57) ABSTRACT

A system and a method for constructing a printed ceramic object, the method including the steps of extruding a substance to generate a 3D-printed elastomeric object; deforming the 3D-printed elastomeric object into a complex structure to form a printed elastomeric origami object; and transforming the printed elastomeric origami object into an aforesaid printed ceramic origami object.

20 Claims, 5 Drawing Sheets

METHOD FOR CONSTRUCTING A PRINTED CERAMIC OBJECT AND A CERAMIC OBJECT CONSTRUCTED BY THE SAME

FIELD OF INVENTION

The present invention relates to the printing of ceramic structures. In particular, embodiments of the invention are directed to the printing of deformable objects using polymers. Particular embodiments of the ceramic structure are printed in a manner such that the deforming of the objects occurs by virtue of the materials of the property.

BACKGROUND

Currently most cellphone back plates are made of metals. Ceramic materials as cellphone back plates have some advantages over metals. Ceramics usually can get a better visual and tactile experience for the glossy appearance and delicate texture. Ceramics also get better resistance to deformation, due to better mechanical and thermal behaviours, such as higher hardness and strength, higher thermal stability. Furthermore, the excellent behaviours of ceramics in transmission of electromagnetic signals can meet the requirements of the 5G age. Those abovementioned properties, together with other excellent properties like corrosion resistance and low density, make ceramic cellphone back plates an advanced topic which deserves more attention.

However, ceramics are usually difficult to be cast or machined, due to the extremely high melting temperature, hindering the development of ceramic cellphone back plates, especially for the curved cellphone back plate.

It is against this background that the present invention has been developed.

SUMMARY OF THE INVENTION

In one aspect, the present invention provides a method for constructing a printed ceramic object, the method comprising the steps of:
  A. extruding a substance to generate a 3D-printed elastomeric object;
  B. deforming the 3D-printed elastomeric object into a complex structure to form a printed elastomeric origami object; and
  C. transforming the printed elastomeric origami object into an aforesaid printed ceramic origami object.

In one embodiment, the generated 3D-printed elastomeric object includes a plane surface.

In one embodiment, step B further includes step B1 of bending the 3D-printed elastomeric object to introduce a radius of curvature to the plane surface.

In one embodiment, the printed ceramic origami object includes a curved surface.

In one embodiment, the method further includes step A1, following step A, of curing the 3D-printed elastomeric object to manipulate the degree of elastomer-to-ceramic transformation in step C.

In one embodiment, the substance is extruded through a nozzle.

In one embodiment, the substance comprises inks.

In one embodiment, the inks comprise particles and polymers.

In one embodiment, the elastomer-to-ceramic transformation occurs via pyrolysis in a vacuum or under an inert atmosphere.

In one embodiment, the heating temperature of elastomer-to-ceramic transformation is ranged from 400° C. to 2000° C.

In one embodiment, the inks are formed from a homogenous distribution of the particles in the polymers.

In one embodiment, the weight percentage of the particles in the inks is in the range of from about 1% to about 90%.

In one embodiment, the weight percentage of the polymers in the inks is in the range of from about 10% to about 99%.

In one embodiment, the polymers include at least one of silicone rubber, silicone resin, elastomers and hydrogels.

In one embodiment, the particles include at least one of zirconium dioxide particles, zirconium dioxide nanoparticles, iron oxide, copper oxide, gold oxide, cobalt oxide, chromium oxide, bismuth oxide, manganese oxide, antimony oxide, calcium oxide particles, aluminium oxide particles, titanium dioxide particles, indium oxide particles, zinc oxide particles, silicon dioxide particles, aluminium nitride particles, calcium silicate particles, silicon carbide particles, polymeric particles, metallic particles, carbon black particles, graphene particles, graphite particles, diamond particles and refractory materials.

In one embodiment, the deforming of elastomeric object is limited by a high temperature resistant object with a predefined radius of curvature.

In one embodiment, each of the 3D-printed ceramic object and the printed ceramic origami object includes a dimension of 100 μm or more.

In one aspect, the present invention provides a ceramic object constructed by the method of the present invention.

In one embodiment, the object forms a back plate of an electronic device.

In one embodiment, the electronic device includes one of cellphone, laptop and computing device.

BRIEF DESCRIPTION OF THE DRAWINGS

Notwithstanding any other forms which may fall within the scope of the present invention, a preferred embodiment will now be described, by way of example only, with reference to the accompanying drawings in which.

DETAILED DESCRIPTION OF PREFERRED EMBODIMENTS

In the ensuing description, certain terms, once introduced, will be abbreviated for the sake of brevity and to improve readability. It will be understood that the use of such abbreviations should not be construed as being limiting or otherwise placing a "gloss" on the meanings of such terms beyond the meanings that would be placed on the terms when construed by a skilled addressee.

In the present specification, elastomeric ceramic precursors are developed, and can be printed, deformed, and then transformed into complex-shaped elastomer-derived ceramics (EDCs). Printing origami structures involves conventional three-dimensional (3D) printing followed by a shape-morphing step, and demonstrates its potential in fabricating curved object such as cellphone back plate.

The present additive manufacturing techniques have unique advantages in fabricating ceramic back plates, including programmable and customizable designing, geometrical complexity, cost efficiency, color versatility, excellent mechanical robustness.

The inventors have, through their own research and experiences, devised that substance made of combination of particles and polymers are particularly suitable for using as ink in 3D printing.

Figure 1:
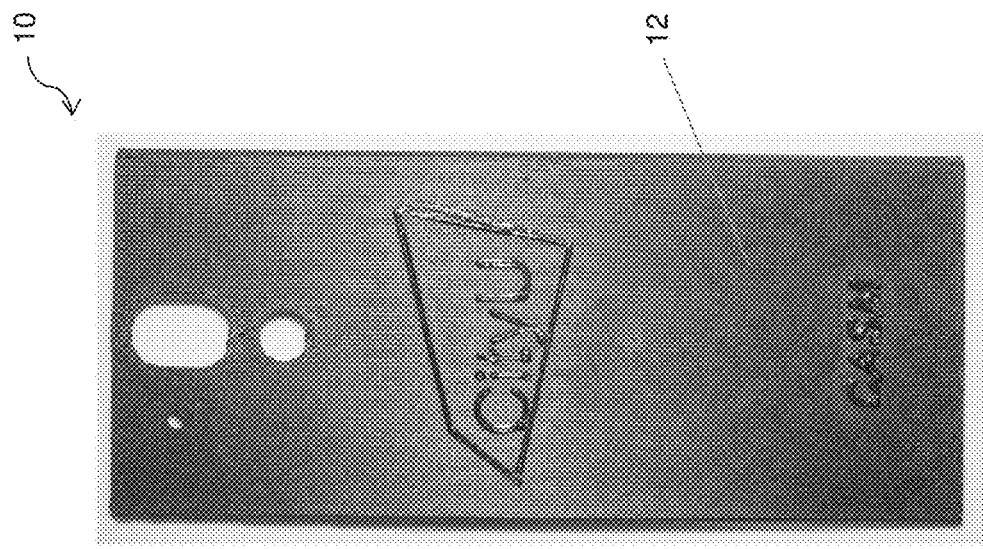
FIG. 1 shows a top view of an example 3D-printed ceramic cellphone back plate.
Figure 2:
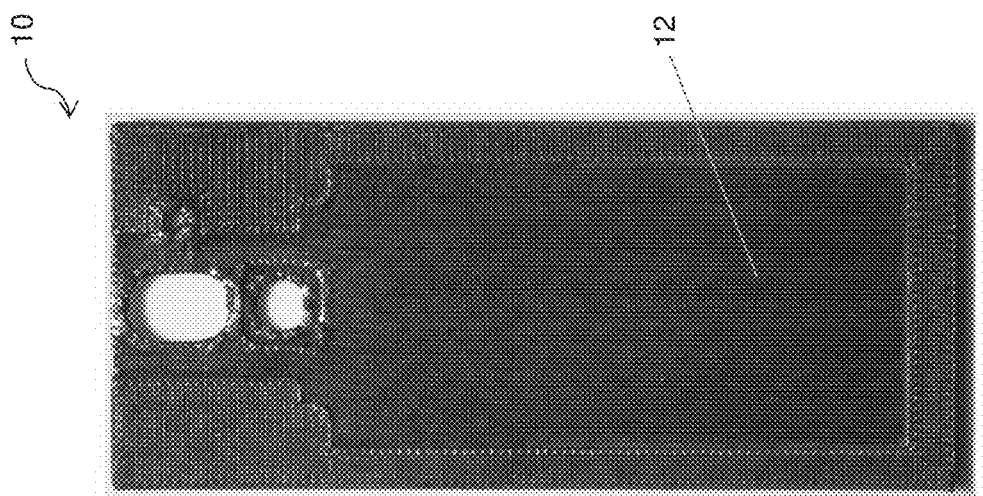
FIG. 2 shows a bottom view of an example 3D-printed ceramic cellphone back plate.
Figure 3:
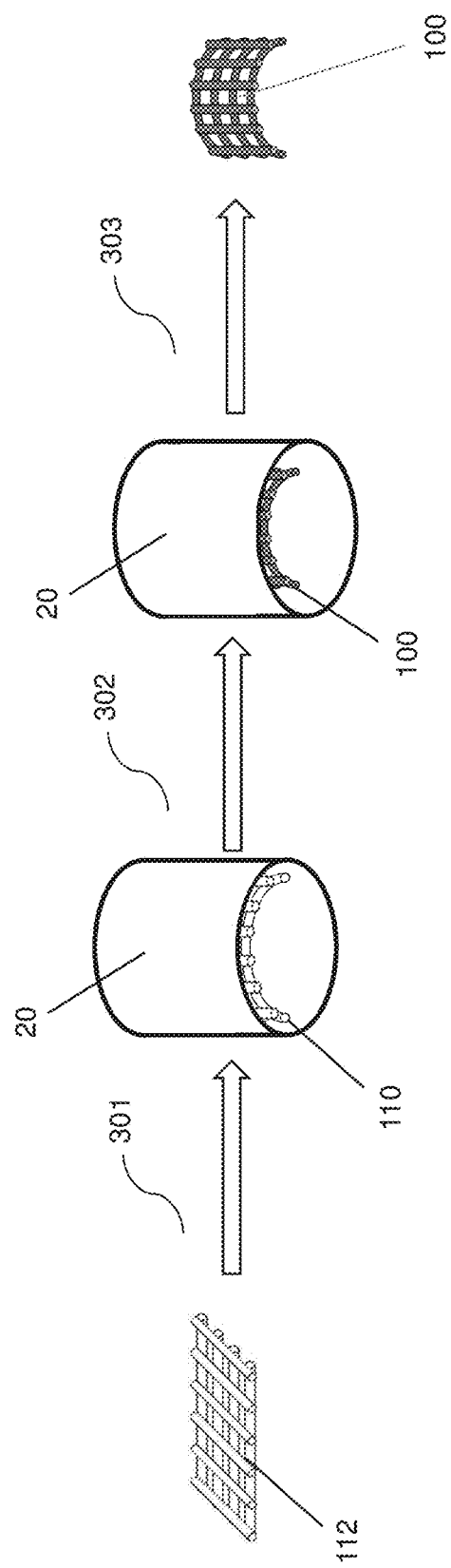
FIG. 3 shows schematic of constructing an example printed ceramic origami cellphone back plate.

In a 3D printing process, inks including particles and polymers are extruded through a nozzle, whereby a 3D-printed elastomeric object is formed. The 3D-printed elastomeric object is then converted into a ceramic object e.g. a 3D-printed ceramic cellphone back plate 10. As depicted in FIGS. 1 and 2, the 3D-printed ceramic cellphone back plate 10 has a substantial plane surface 12 for supporting an electronic device such as cellphone, laptop and computing device etc.

The present invention, in at least one embodiment, provides an improved method for constructing a printed ceramic origami object, the method comprising the steps of: extruding a substance to generate a 3D-printed elastomeric object (step A); deforming the 3D-printed elastomeric object into a complex structure to form a printed elastomeric origami object (step B); and transforming the printed elastomeric origami object into an aforesaid printed ceramic origami object 100 (step C).

Figure 4:
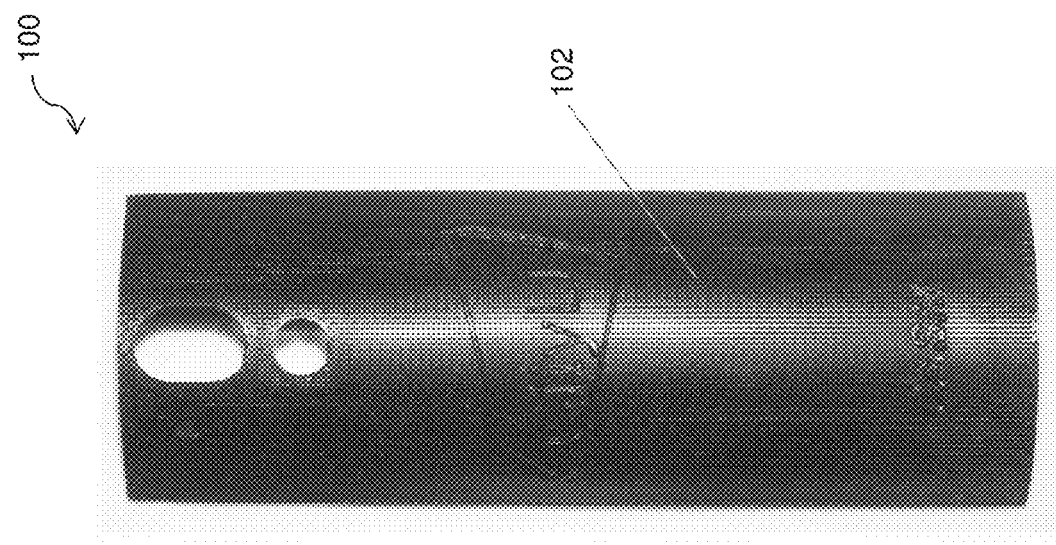
FIG. 4 shows a top view of an example printed ceramic origami cellphone back plate.
Figure 5:
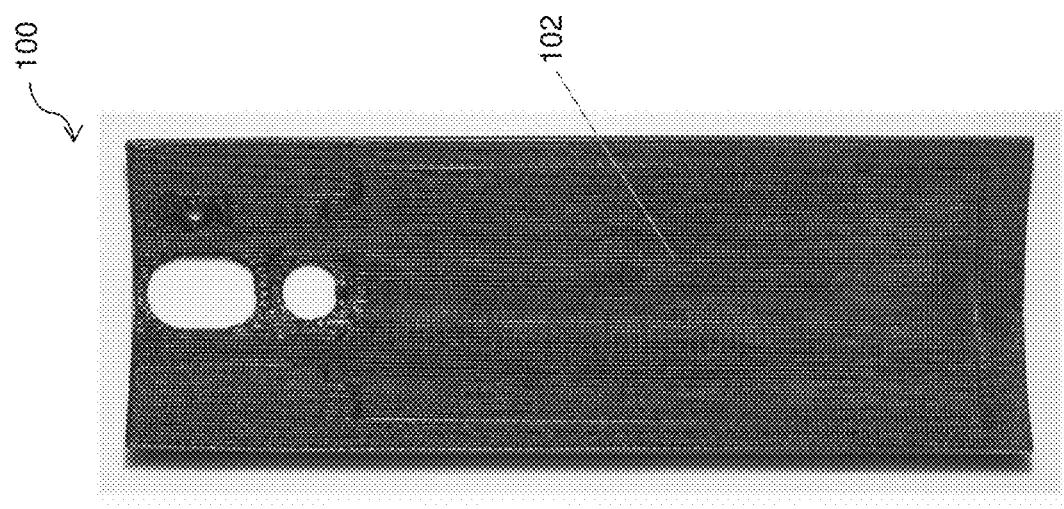
FIG. 5 shows a bottom view of an example printed ceramic origami cellphone back plate.

In one example embodiment, a printed ceramic origami 100 e.g. curved cellphone back plate as depicted in FIGS. 4 and 5 is constructed by deforming an elastomeric origami 110 e.g. 3D-printed elastomeric cellphone back plate made of 3D-printed elastomer 112 against a high temperature resistant object 20 e.g. a ceramic object with a predefined radius of curvature at step 301. The deformation of the 3D-printed elastomeric cellphone back plate 110 is limited by the ceramic object 20 under heating in Argon or vacuum at step 302. Upon the completion of elastomer-to-ceramic transformation, a curved ceramic cellphone back plate 100 as depicted in FIGS. 4 and 5 is formed and separated from the ceramic object 20 at step 303.

In one example embodiment, the 3D printing of elastomeric object e.g. cellphone back plate is conducted by using a direct ink writing 3D printer and a substance e.g. ink for printing at room temperature. Each ink housed in a syringe is extruded through a nozzle e.g. having 260 or 410 μm diameter with a controlled gas pressure, and is then deposited onto the printing plate. The gas pressure is regulated in the range of 0.2-0.6 MPa at a printing speed of 10-50 mm s$^{-1}$, and adjusted based on ink behaviors and the nozzle diameter. The height of each printed layer is typically set as 0.8 times of the nozzle diameter to achieve good adhesion between printed layers.

In more details, the inks are preferably formed from a homogenous distribution of the particles in the polymers. The weight percentage of the particles in the inks is in the range of from about 1% to about 90%. On the other hand, the weight percentage of the polymers in the inks is in the range of from about 10% to about 99%.

Without limited by the following examples, the polymers may include one or more polymers such as silicone rubber, silicone resin, elastomers and hydrogels, and the particles may include one or more particles such as zirconium dioxide particles, zirconium dioxide nanoparticles, iron oxide, copper oxide, gold oxide, cobalt oxide, chromium oxide, bismuth oxide, manganese oxide, antimony oxide, calcium oxide particles, aluminium oxide particles, titanium dioxide particles, indium oxide particles, zinc oxide particles, silicon dioxide particles, aluminium nitride particles, calcium silicate particles, silicon carbide particles, polymeric particles, metallic particles, carbon black particles, graphene particles, graphite particles, diamond particles and refractory materials.

In one preferred example embodiment, the combination of particles and polymers of the inks utilised are zirconia dioxide nanoparticles reinforced with silicone rubber. The nanoparticles are incorporated into silicone rubber matrix, which improves the structural stability and eliminates the shrinkage upon ceramization.

The inventors have also devised that the 3D-printed elastomers are soft, and can be stretched beyond 3 times their initial length. The flexibility and stretchability of the elastomer offers opportunities to shape-morphing process e.g. through deformation or bending.

Figure 6:
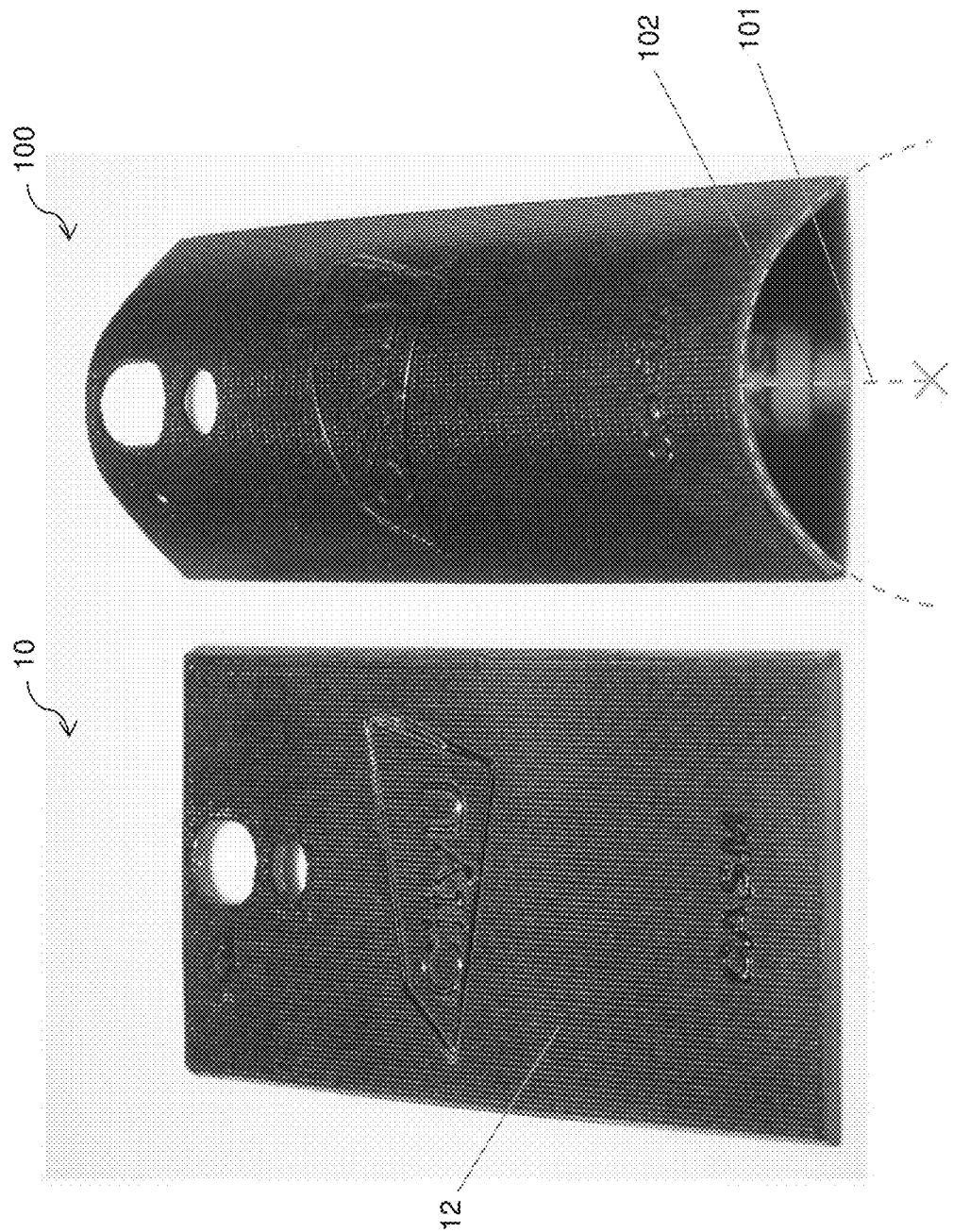
FIG. 6 shows the comparison of bottom views of 3D-printed ceramic cellphone back plates of FIGS. 1 to 2 and printed ceramic origami cellphone back plates of FIGS. 4 to 5.
Figure 7:
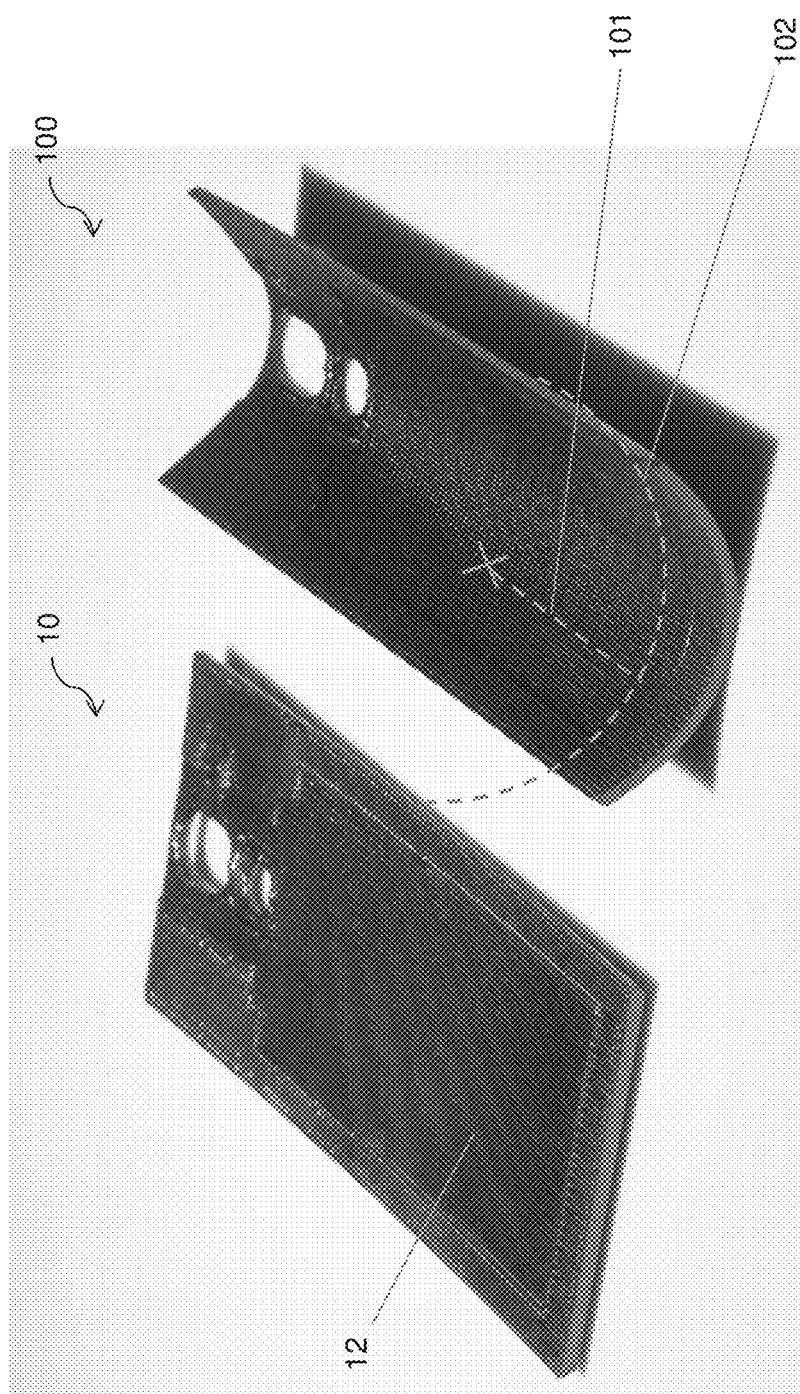
FIG. 7 shows the comparison of top views of 3D-printed ceramic cellphone back plates of FIGS. 1 to 2 and printed ceramic origami cellphone back plates of FIGS. 4 to 5.

Preferably, an initial 3D-printed elastomeric object includes a plane surface. With the elastic property offered by the 3D-printed elastomeric object, the 3D-printed elastomeric object may be bendable or deformable to introduce a radius of curvature 101 to the plane surface, thereby forming a printed elastomeric origami object with a curved surface 102, as depicted in FIGS. 6 and 7. For instance, each of the 3D-printed ceramic object and the printed ceramic origami object has a dimension of 100 μm or more.

In one example embodiment, inks including particles and polymers are extruded through a nozzle, whereby an aforesaid 3D-printed elastomeric cellphone back plate is formed. The 3D-printed elastomeric cellphone back plate is then deformed into a complex structure by one or more mechanical systems to form a printed elastomeric origami cellphone back plate. For instance, the mechanical system may include a high temperature resistant object e.g. a ceramic object with a predefined radius of curvature, such that the degree of deformation of the 3D-printed elastomeric cellphone back plate is limited by the ceramic object during the high temperature elastomer-to-ceramic transformation process.

Finally, the printed elastomeric origami cellphone back plate is converted into the printed ceramic origami cellphone back plate 100 as shown in FIGS. 4 and 5.

Preferably, the elastomer-to-ceramic transformation occurs via pyrolysis in a vacuum or under an inert atmosphere. In one specific example, EDCs may be obtained by heating printed elastomer objects to 1,300° C. for 5 hours in a tube furnace with an argon flow of 20 mL min$^{-1}$ and heating and cooling rates of 1° C. min$^{-1}$.

Selectively, the heating temperature of elastomer-to-ceramic transformation may be ranged from 400° C. to 2000° C.

Preferably, the elastomeric structures may undergo limited and uniform shrinkage during the elastomer-to-ceramic transformation. This ensures that the printed ceramic origami object maintains substantially the same shape as the printed elastomeric origami object.

Optionally, a post cure of the 3D-printed elastomeric object may be performed, prior to deformation or bending, at e.g. 150° C. for 30 minutes to guarantee sufficient degree of crosslinking. Such cure process may limit undesired and/or excessive shape changes during pyrolysis. Thus, the shape changes contributed by the elastomer-to-ceramic transformation may be manipulated by the user and adjusted to adapt for 3D-printed elastomeric objects extruded from inks with different material properties.

The scalability of this method is demonstrated by the printed cellphone back plate examples with a dimension of about several centimeters, which could meet the requirements of many structural applications including communications, computers, and consumer electronics.

The embodiments and broader invention described herein provide a number of advantages and have broad industrial applicability.

Here are the advantages for 3D printing of ceramic objects.

Firstly, the techniques and materials utilised and developed as part of the embodiments described herein allow for the creation of objects with excellent behaviours of conventional ceramics, like good visual and tactile experience, good mechanical and thermal behaviours, good transmission of electromagnetic signals, corrosion resistance and low density.

Secondly, the present additive manufacturing techniques enable programmable and customizable designing.

Thirdly, the techniques and materials utilised and developed as part of the embodiments enable breakthroughs in geometrical complexity of ceramic structures generated by 3D printing.

Fourthly, the techniques and materials utilised and developed as part of the embodiments are cost effective and can be processed in a cost efficient manner.

Fifthly, the techniques and materials utilised and developed as part of the embodiments enable color versatility in fabricated ceramic object with various feedstock systems.

Sixthly, all the materials and techniques used in the embodiments are based on commercially available and open-end feedstock systems, further showing that the embodiments described herein have commercial potential and industrial applicability.

Seventhly, in a more general sense, the abovementioned advantages provide the possibility that the materials and techniques of the embodiments can be utilized in many structural applications including communications, computers, and consumer electronics.

Here are the further advantages for printing of ceramic origami objects, compared with 3D printing.

Firstly, printing of ceramic origami objects is more cost-efficient in term of time, because a series of complex-shaped ceramics with continuously variable geometries can be derived from a simple design.

Secondly, various shape-morphing systems can provide great freedom in designing geometrically complex ceramic objects that are almost impossible to create by any other method.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

This invention is not to be limited to or by any specific recitation of advantages or industrial applicability.

The invention claimed is:

1. A method for constructing a printed ceramic object, the method comprising the steps of:
   A. extruding a substance to generate a 3D-printed elastomeric object;
   B. deforming the 3D-printed elastomeric object into a complex structure to form a printed elastomeric origami object; and
   C. transforming the printed elastomeric origami object into a printed ceramic origami object.

2. The method of claim 1, wherein the generated 3D-printed elastomeric object includes a plane surface.

3. The method of claim 2, wherein step B further including step B1 of bending the 3D-printed elastomeric object to introduce a radius of curvature to the plane surface.

4. The method of claim 1, wherein the printed ceramic origami object includes a curved surface.

5. The method of claim 1, further including step A1, following step A, of curing the 3D-printed elastomeric object to manipulate a degree of elastomer-to-ceramic transformation in step C.

6. The method of claim 1, wherein the substance is extruded through a nozzle.

7. The method of claim 1, wherein the substance comprises inks.

8. The method of claim 7, wherein the inks comprise particles and polymers.

9. The method of claim 1, wherein the elastomer-to-ceramic transformation occurs via pyrolysis in a vacuum or under an inert atmosphere.

10. The method of claim 9, wherein a heating temperature of elastomer-to-ceramic transformation is ranged from 400° C. to 2000° C.

11. The method of claim 8, wherein the inks are formed from a homogenous distribution of the particles in the polymers.

12. The method of claim 8, wherein the weight percentage of the particles in the inks is in a range of from about 1% to about 90%.

13. The method of claim 8, wherein the weight percentage of the polymers in the inks is in a range of from about 10% to about 99%.

14. The method of claim 8, wherein the polymers include at least one of silicone rubber, silicone resin, elastomers and hydrogels.

15. The method of claim 8, wherein the particles include at least one of zirconium dioxide particles, zirconium dioxide nanoparticles, iron oxide, copper oxide, gold oxide, cobalt oxide, chromium oxide, bismuth oxide, manganese oxide, antimony oxide, calcium oxide particles, aluminium oxide particles, titanium dioxide particles, indium oxide particles, zinc oxide particles, silicon dioxide particles, aluminium nitride particles, calcium silicate particles, silicon carbide particles, polymeric particles, metallic particles, carbon black particles, graphene particles, graphite particles, diamond particles and refractory materials.

16. The method of claim 1, wherein the deforming of elastomeric object is limited by a high temperature resistant object with a predefined radius of curvature.

17. The method of claim 1, wherein each of the 3D-printed elastomeric object and the printed ceramic origami object includes a dimension of 100 μm or more.

18. A ceramic object constructed by the method in accordance with claim 1.

19. The ceramic object of claim 18, wherein the object forms a back plate of an electronic device.

20. The ceramic object of claim 19, wherein the electronic device includes one of cellphone, laptop and computing device.

* * * * *